US011525245B2

(12) United States Patent
Navarro Alvarado et al.

(10) Patent No.: US 11,525,245 B2
(45) Date of Patent: Dec. 13, 2022

(54) AUTOMATIC RAINWATER COLLECTION SYSTEM

(71) Applicants: Christian Eduardo Navarro Alvarado, Guanajuato (MX); Jose Ivan Gallardo Flores, Guanajuato (MX); Marcos Raul Gallardo Dobles, Guanajuato (MX)

(72) Inventors: Christian Eduardo Navarro Alvarado, Guanajuato (MX); Jose Ivan Gallardo Flores, Guanajuato (MX); Marcos Raul Gallardo Dobles, Guanajuato (MX)

( * ) Notice: Subject to any disclaimer, the term of this patent is extended or adjusted under 35 U.S.C. 154(b) by 118 days.

(21) Appl. No.: 17/044,815

(22) PCT Filed: Oct. 16, 2018

(86) PCT No.: PCT/MX2018/000106
§ 371 (c)(1),
(2) Date: Oct. 1, 2020

(87) PCT Pub. No.: WO2020/080923
PCT Pub. Date: Apr. 23, 2020

(65) Prior Publication Data
US 2021/0140150 A1 May 13, 2021

(51) Int. Cl.
*C02F 1/00* (2006.01)
*C02F 1/28* (2006.01)
(Continued)

(52) U.S. Cl.
CPC .............. *E03B 3/02* (2013.01); *C02F 1/008* (2013.01); *C02F 9/00* (2013.01); *C02F 1/001* (2013.01);
(Continued)

(58) Field of Classification Search
CPC ..... E03B 3/02; E03B 3/03; E03B 3/28; E03B 3/30; E03B 11/02; C02F 1/008;
(Continued)

(56) References Cited

U.S. PATENT DOCUMENTS 5,606,990 A * 3/1997 Clark ..................... E03B 3/03
137/259
6,436,283 B1 * 8/2002 Duke ..................... E03B 3/02
210/748.11
(Continued)

FOREIGN PATENT DOCUMENTS

CN 102839714 A 12/2012
WO 2016092567 A1 6/2016
WO 2016113454 A1 7/2016

OTHER PUBLICATIONS

Derwent translation of patent publication CN 201809808, Shenglan Guo et al, published Apr. 27, 2011. (Year: 2011).*

*Primary Examiner* — Joseph W Drodge
(74) *Attorney, Agent, or Firm* — Hoglund & Pamias, PSC; Roberto J. Rios

(57) ABSTRACT

An automatic rainwater collection system, with a high degree of autonomy and sensitivity, which allows the collection and use of rainwater, in open spaces, areas of difficult access and/or lacking of water extraction systems, as well as in domestic spaces such as gardens or roofs, without additional adaptations for its use and which works with solar energy. The automatic rainwater collection system is conformed by: a flower-shaped obturable rainwater receiving element, which comprises: a plurality of internal petals and a plurality of external petals that can be opened or closed in an automated manner, a sensor with high sensitivity to droplet impacts and/or relative humidity, which is operatively connected to a motor to control the opening and closing of the plurality of petals of the rainwater receiving element; a support frame, which functions as a support for the obturable rainwater receiving element and as a water storage media; a modular system for filtering water, connected to said central media of water accumulation, which comprises a plurality of filtering modules, which provide (Continued)

different filtering options depending on the quantity and combination thereof in order to obtain different qualities of water for use in several activities; and a water storage media, which further functions as base and support of the collection system.

6 Claims, 7 Drawing Sheets

(51) Int. Cl.
  *E03B 3/02* (2006.01)
  *C02F 1/32* (2006.01)
  *C02F 1/42* (2006.01)
  *C02F 1/44* (2006.01)
  *C02F 1/50* (2006.01)
  *C02F 9/00* (2006.01)
  *C02F 101/10* (2006.01)
  *C02F 101/30* (2006.01)
  *C02F 103/00* (2006.01)

(52) U.S. Cl.
  CPC .............. *C02F 1/283* (2013.01); *C02F 1/325* (2013.01); *C02F 1/42* (2013.01); *C02F 1/441* (2013.01); *C02F 1/50* (2013.01); *C02F 2001/007* (2013.01); *C02F 2101/10* (2013.01); *C02F 2101/306* (2013.01); *C02F 2103/001* (2013.01); *C02F 2201/007* (2013.01); *C02F 2201/009* (2013.01); *C02F 2303/04* (2013.01)

(58) Field of Classification Search
  CPC .. C02F 9/00; C02F 1/001; C02F 1/283; C02F 1/325; C02F 1/42; C02F 1/441; C02F 1/50; C02F 2001/007; C02F 2101/10; C02F 2101/306; C02F 2103/001; C02F 2201/007; C02F 2201/009; C02F 2303/04; C02F 1/32; C02F 1/76; C02F 1/78; C02F 2303/24; C02F 9/005; C02F 1/003; C02F 1/44; C02F 2209/00; C02F 2209/40; C02F 2303/244; Y02A 20/108; Y02A 20/00; Y02A 20/212
  See application file for complete search history.

(56) References Cited

U.S. PATENT DOCUMENTS

| | | | |
|---|---|---|---|
| 10,597,895 B1* | 3/2020 | Daniels | G05B 15/02 |
| 2004/0200542 A1* | 10/2004 | Kruger | E03B 3/03 |
| | | | 141/126 |
| 2005/0133090 A1 | 6/2005 | Couturier | |
| 2009/0031642 A1* | 2/2009 | Donovan | E04H 1/06 |
| | | | 52/79.1 |
| 2009/0212051 A1* | 8/2009 | Liu | E03B 3/03 |
| | | | 206/457 |
| 2011/0308618 A1* | 12/2011 | Lorenz | E03B 1/042 |
| | | | 137/1 |
| 2014/0231328 A1* | 8/2014 | Sheehy | E03B 1/041 |
| | | | 137/565.17 |
| 2015/0021247 A1* | 1/2015 | Lin-Hendel | C02F 1/78 |
| | | | 210/170.03 |
| 2017/0332564 A1* | 11/2017 | Wales | E03B 1/04 |
| 2018/0266086 A1* | 9/2018 | Newsome | E03B 3/02 |
| 2018/0341042 A1* | 11/2018 | Soltani | G01F 23/241 |
| 2019/0056149 A1* | 2/2019 | Thomson | H02S 20/22 |

* cited by examiner

AUTOMATIC RAINWATER COLLECTION SYSTEM

TECHNICAL FIELD

The present invention is related to the field of rainwater collection systems. Particularly, the present invention relates to an automatic rainwater collection and filtering system.

BACKGROUND OF THE INVENTION

The pluvial precipitation coming from the atmosphere, which is product of the natural hydrologic cycle of the water, corresponds to 0.001% of the total surface water in the earth. This percentage, although it seems to be small, is greater in magnitude to all the available water in the rivers of the planet, which corresponds only to 0.0001% on average.

The collection of rainwater represents a sustainable alternative for obtaining clean water in poor or deficient places of continental water bodies such as rivers, lakes or aquifers. The water collected from rain has important applications in agricultural and domestic sectors, including its use for watering gardens, hygienic activities such as its use in toilets flushing, clothes washing and even, if properly treated, for human consumption.

The current commercial rainwater collection systems comprise large pipe and container systems, which make use of the available area on the roofs of homes for the collection. However, said devices present various limitations in terms of their operation and handling, including the high costs of installation, maintenance, cleaning and care by the user, high investments which are necessary for their installation and low collection efficiency.

Another type of alternative for rainwater collection, includes the installation of pools or tanks, which are built on large areas of open-air drilled earth, demanding a high initial investment, which makes them practically unaffordable for use in domestic environments, and, if they are used in agriculture, the area available for cultivation decreases considerably.

Likewise, there are devices which can capture water through the collection of relative humidity in the land or the desalination of seawater, however, its operation still limits its use in domestic, agricultural and industrial environments, mainly due to its high operating costs and low efficiency percentage of water recovery.

Among the main limitations of the water collection systems, are the high costs of maintenance and operation, the almost null offer of autonomous collection systems, and mainly, the almost non-existent offer of devices that, in addition to the collection, allow the treatment of the water collected in order to increase its uses in different types of domestic and consumption applications.

According to the previous, in the prior art, there is the patent document WO16092567, which describes a system for collecting water and solar energy for use in open spaces. The system comprises at least one structure similar to an inverted cone, which is composed of an awning to collect rainwater, said awning is made of waterproof materials such as PVC, fabric and/or antioxidant metals; at least one discharge opening for the outlet of the collected water; a storage unit to store the collected water; connecting means extending from the water discharge opening to the storage unit to allow the flow of water captured from the awning toward the storage unit; and at least two filter media adapted between the awning and the storage unit for filtering the captured water. One of the two filtering media is a filtering screen adapted in the discharge opening of the awning of at least 10,000 microns and the other is a removably adaptable filtering device in the connecting means which comprises: a housing; a vertical filtering network of 20 microns to remove fine dust and dirt particles in rainwater; and a mesh of at least 1 micron adapted following the vertical filtering screen, to substantially remove the whole smaller particles dirt. The vertical design of the filtering screen increases the available surface for filtration, since it improves the flow rate of the water that passes through thereof. Likewise, said invention allows adapting various types of water filtering systems, such as UV filtering (Ultraviolet), Reverse osmosis (RO) or any microbial filtering system, in order to obtain potable water and, at least, one foldable solar module for the collection of solar energy, which is removable or fixedly attached to the awning. However, this invention lacks of automatic elements which offer the possibility of opening and closing the inverted cone type structure, for the collection of water autonomously, so it is necessary to use filter screens of large size, which over time, retain objects that prevent the passage of collected water to the storage systems and that must be removed manually, increasing their potential of autonomy and increasing maintenance requirements, and limiting its use in areas of difficult access.

There is also the document US2005133090, which refers to a water collector, which has a collection system similar to an umbrella, which is preferably used in an inverted vertical position, like a funnel, to receive rainwater. The center of this folding funnel is open and allows water to flow through thereof. The funnel is placed on a vertical tubular housing, which has the dual purpose of channeling the water to a cistern, and serve as a protection for the funnel in its folded embodiment; a mechanism consisting of a pulley system, and, optionally, an electric motor, which allows the funnel to be expanded and retracted through manual activation or the use of automated systems through a digital control circuit, which obeys sensors of humidity and wind speed. However, this invention does not have water filtering systems, thus, the use of collected water is limited. Likewise, although it presents an advantage related to the degree of automation and greater control relative to other systems present in the prior art, the sensors used for the detection of humidity, and the subsequent opening or closing of the funnel of the water collection, are not sufficiently sensitive to low concentrations of precipitation, thereby generating a low efficiency of collecting under these conditions.

Therefore, in the state of the art, there is not any pluvial water collection system, which has a high degree of autonomy; allow to collect water even in low concentrations of precipitation; make use of a variety of filters which allow to take advantage of the collected water in various applications, depending on the required filtering level for the same, including: domestic activities, irrigation of crops and even for human consumption; requires low levels of maintenance, and therefore, it can be used in areas of difficult or null access for its operation; and that, in turn, allows the collection of solar energy, as the main source for its operation.

OBJECTS OF THE INVENTION

It is therefore an object of the present invention to provide an automatic rainwater collection system, which allows the collection of rainwater in open spaces, areas of difficult access and areas lacking water extraction or accumulation systems.

Another object of the present invention is to provide an automatic rainwater collection system, which can be used in domestic spaces such as gardens or roofs, without additional adaptations for its use.

A further object of the present invention is to provide an automatic rainwater collection system, which requires very little maintenance for its correct functioning and operation.

Another object of the present invention is to provide an automatic rainwater collection system, which does not require intervention by the user for its operation.

A further object of the present invention is to provide an automatic rainwater collection system, which allows capturing solar energy and taking advantage of it to operate.

Still another object of the present invention is to provide an automatic rainwater collection system, which allows rainwater to be collected even in minimum concentrations of precipitation.

Another object of the present invention is to provide an automatic rainwater collection system, which can be used in groups, in order to increase the area of rainwater collection.

Still another object of the present invention is to provide an automatic rainwater collection system, which allows performing different types of water filtering and use it in various applications.

BRIEF DESCRIPTION OF THE INVENTION

These and other objects are achieved through an automatic rainwater collection system, which is conformed by: a flower-shaped obturable rainwater receiving element, which comprises: a plurality of internal petals and a plurality of external petals that can be opened or closed in an automated manner, a sensor with high sensitivity to droplet impacts and/or relative humidity, which is operatively connected to a motor to control the opening and closing of the plurality of petals of the rainwater receiving element; a support frame, which functions as a support for the obturable rainwater receiving element and as a water storage media; a modular system for filtering water, connected to said central media of water accumulation, which comprises a plurality of filtering modules, which provide different filtering options depending on the quantity and combination thereof in order to obtain different qualities of water for use in various activities; and a water storage media, which further functions as base and support of the collection system.

DETAILED DESCRIPTION OF THE INVENTION

Referring to FIGS. 1 to 5, the automatic rainwater collection system numbered generally at 1000 is shown. Said automatic rainwater collection system is mainly conformed by an obturable rainwater receiving element in the form of a flower 1100, a support frame which has the additional function of serving as a water accumulation central media 1200, a modular filtering system 1300 and a water storage system 1400.

As shown in FIGS. 1 to 5, the flower-shaped obturable rainwater receiving element 1100 is composed of a plurality of external petals, wherein in the preferred embodiment, said plurality refers to four external petals 1110 and a plurality of internal petals 1120, which in the preferred embodiment are four; each of said outer petals comprises a sympetalous 1111, wherein said outer petals 1110, sympetalous 1111 and internal petals 1120, are made of materials selected from the group consisting of: glass fiber with resin, polymer injection, rubber, wood, conformed of metal sheet and acetate. Each of said outer petals 1110 and sympetalous 1111, are coupled to a supporting frame 1200 by means of an obturable joining support in a substantially V form 1130 and a joining base 1140, which are pivotally connected from each other, wherein on each arm of said V is attached an outer petal 1110 and a sympetalous 1111, to form a single obturable element that can be placed in an open position and in a closed position. Similarly, the internal petals 1120 are attached to said supporting frame 1200 by an obturable joining support 1130 and a joining base 1140, which are pivotally connected to each other, wherein like the outer petals 1110 and sympetalous 1111, can be placed in an open position and in a closed position. The V-shaped obturable support 1130 and the obturable joining support 1140 are driven by a motorized system conformed by an electric motor (not shown) and a plurality of springs 1150, which allow the retractable and coordinated movement of the external petals 1110, sympetalous 1111 and the internal petals 1120, to adopt said open or closed positions. The arrangement of said V-shaped obturable joining support 1130 of said external petals 1110, sympetalous 1111, internal petals 1220 and the joining base 1140 of said petals and sympetalous, is configured in such a way that in the open position of the system, all the petals and sympetalous remain in an angular position that allows the water falling on the inner surfaces of said petals and sympetalous to fall downwards towards the supporting frame 1200, which also has the function of serving as a media for accumulating water. Although in the preferred embodiment, the plurality of petals and sympetalous is four, it will be apparent for a person skilled in the art that the plurality of petals and sympetalous may be more than four, such as six, eight or ten.

Figure 1:
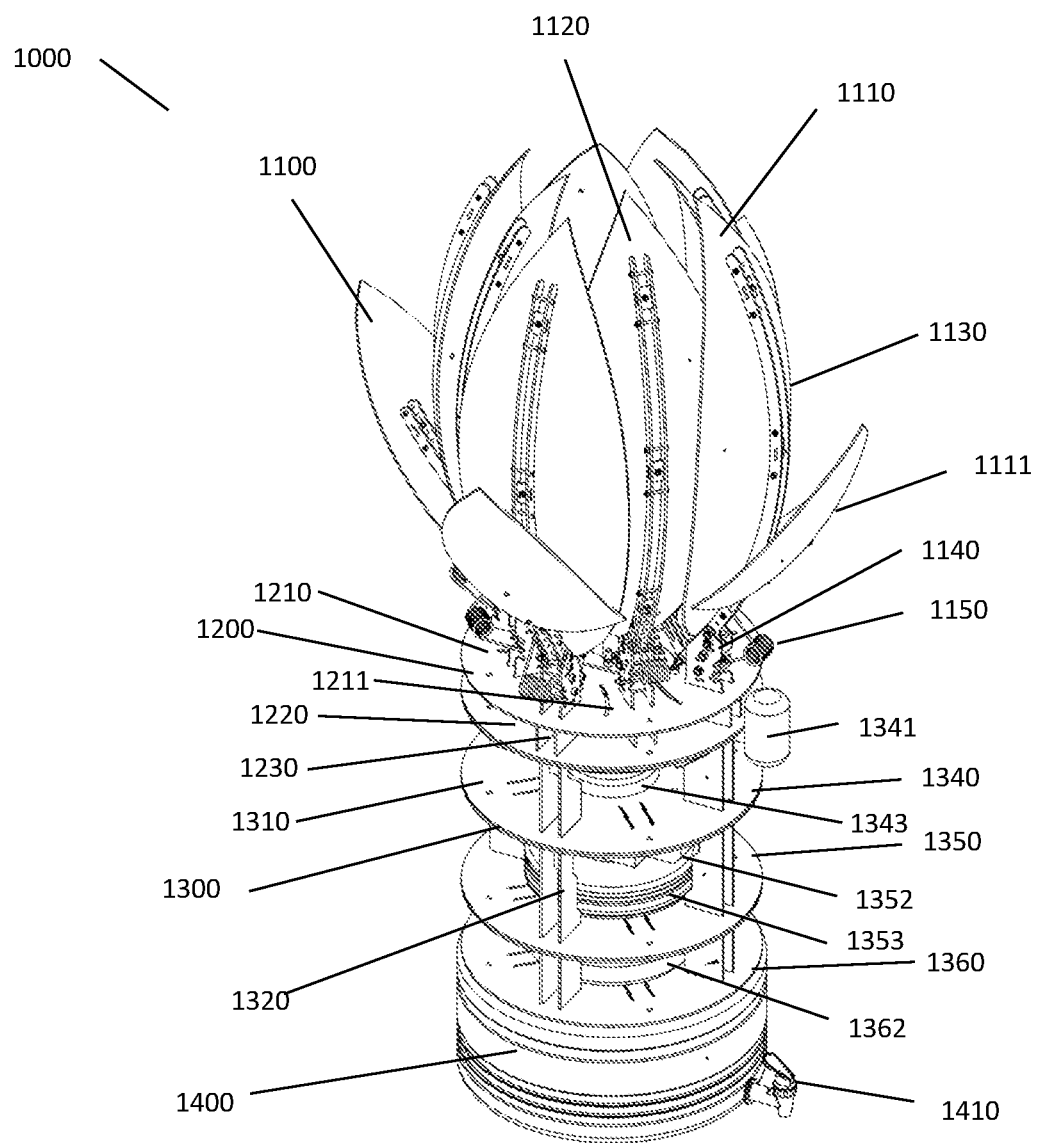
FIG. 1 is a perspective view of the automatic rainwater collection system in a closed conformation.
Figure 2:
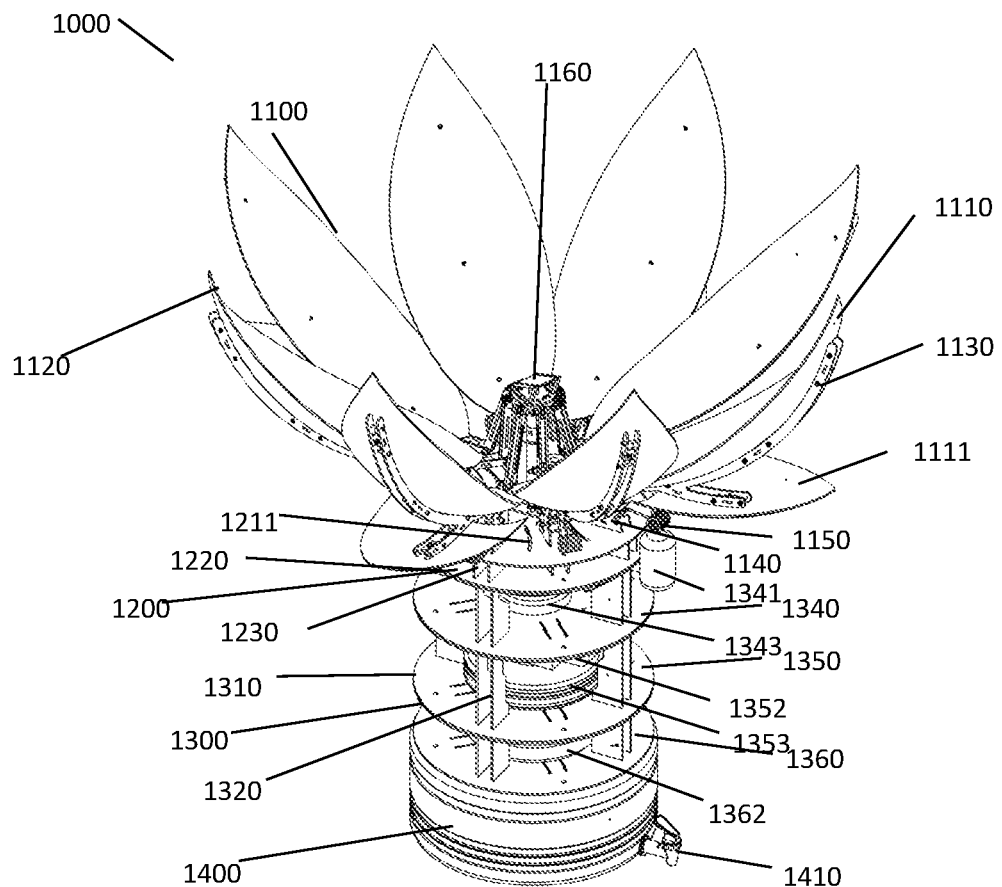
FIG. 2 is a perspective view of the automatic rainwater collection system in an open conformation.
Figure 3:
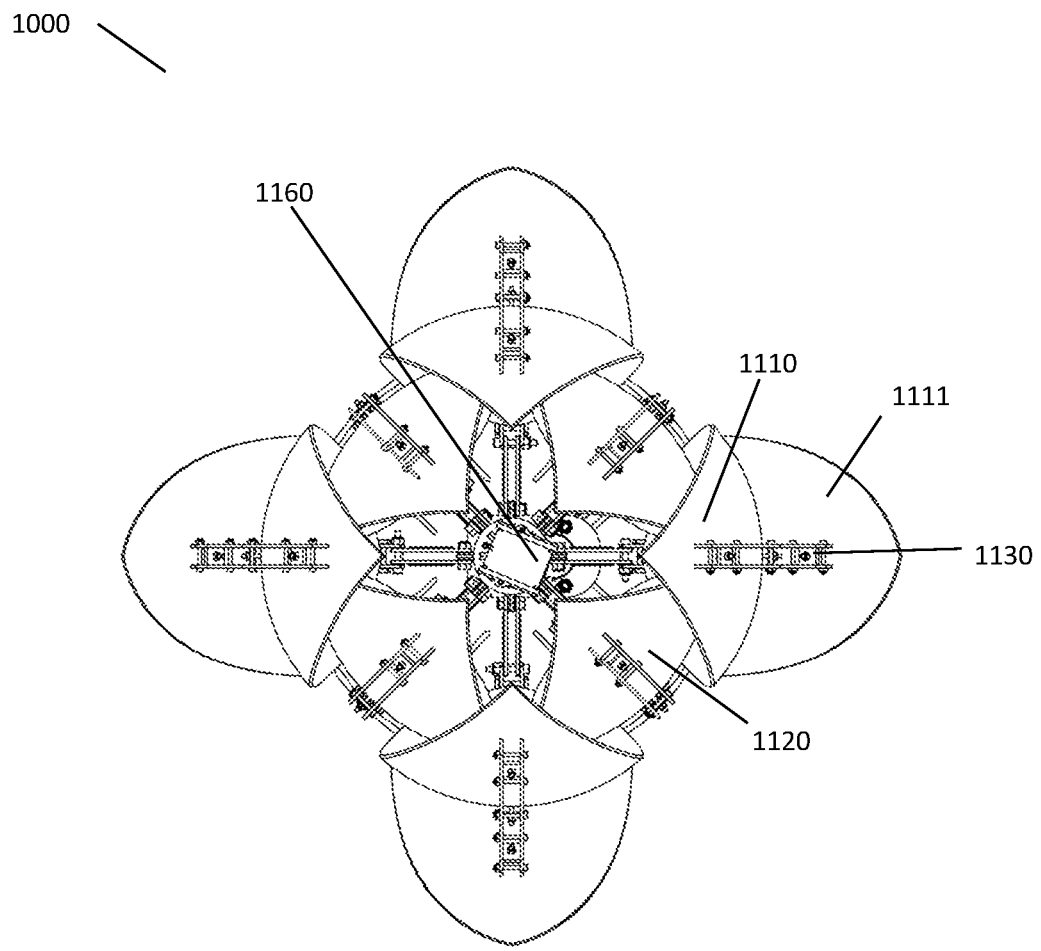
FIG. 3 is a top view of the automatic rainwater collection system in a closed conformation.
Figure 4:
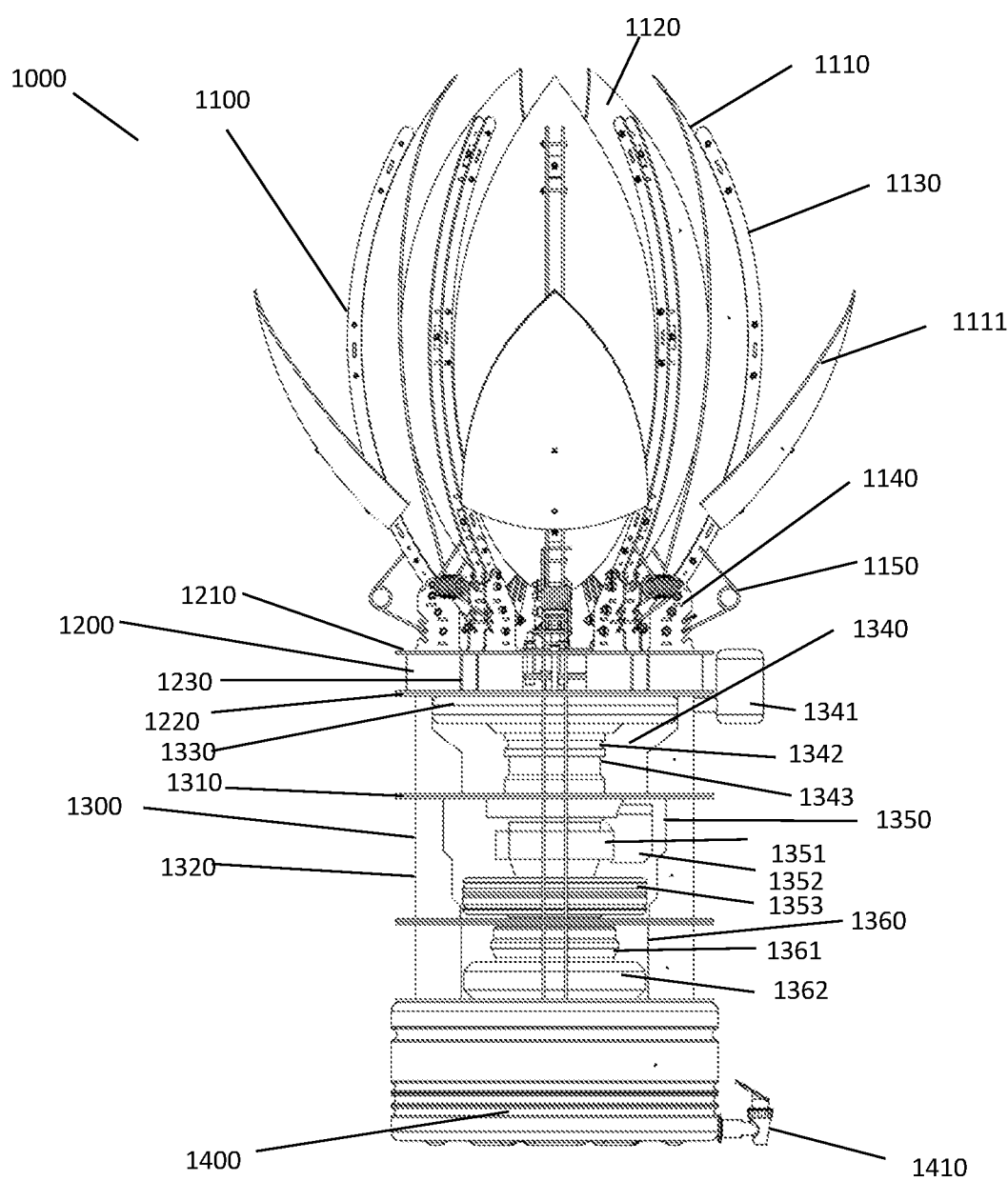
FIG. 4 is a side view of the automatic rainwater harvesting system in a closed conformation.
Figure 5:
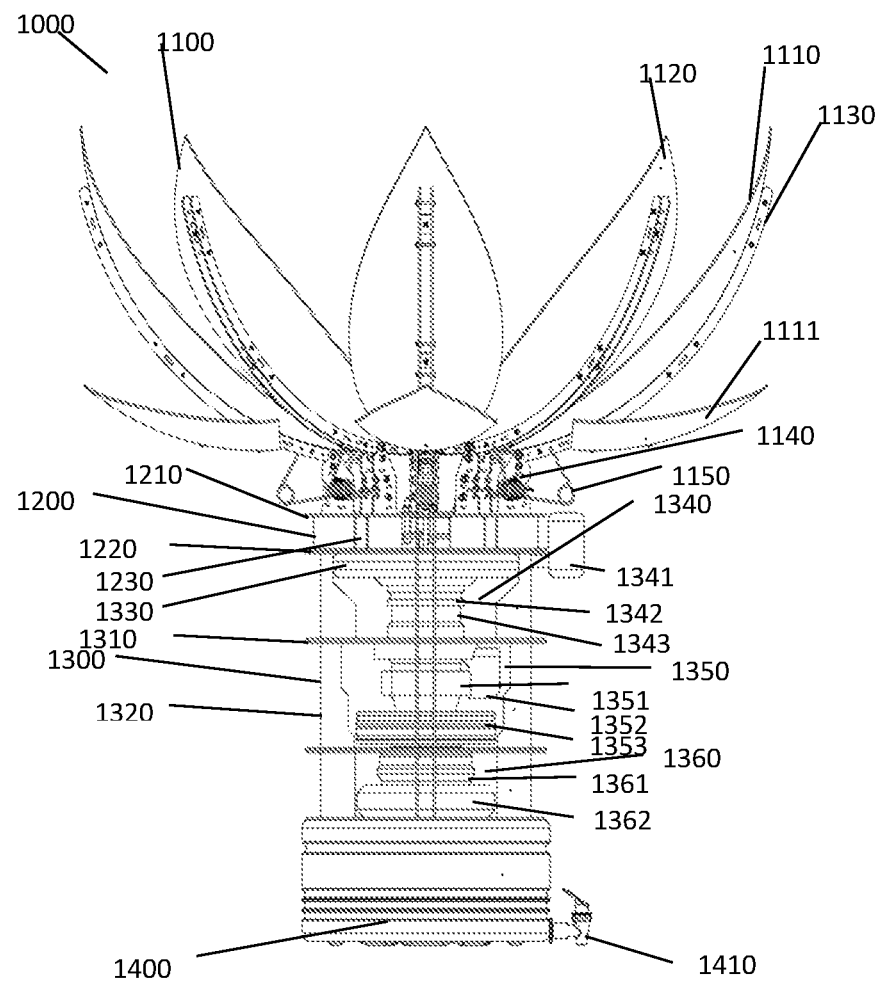
FIG. 5 is a side view of the automatic rainwater collection system in an open conformation.

As shown in FIGS. 2 and 3, the opening and closing of the V-shaped obturable support 1130 and obturable joining support 1140 are controlled by a sensor with high sensitivity 1160 to droplet impacts and/or relative humidity, which is activated with only the detection of small drops of rain or with very low concentrations of rainfall, and closed automatically, when no precipitation is detected.

Referring to FIGS. 1, 2, 4 and 5, it can be appreciated that the support frame 1200 is formed by an upper plate 1210 (which has fixedly joined on its upper surface the joining bases 1140) and a lower plate 1220, joined together in a parallel manner by means of a plurality of perpendicular support plates 1230, wherein said parallel plates comprise a plurality of holes 1211, which allow the support frame 1200 to function as a water storage medium, since through the plurality of holes 1211, it is allowed to direct towards the modular filtering system 1300 the water captured by the flower shaped obturable rainwater receiving element 1100.

The modular filtering system 1300 is formed by a plurality of compartments formed by dividing plates 1310, which are removably joined from each other by means of perpendicular support plates 1320 and to the dividing plates 1310. Each of said compartments is configured to receive a filter element, including but not limited to: a primary filter of solids 1330, which allows separating solids from the collected water, which have a size of up to 5 millimeters; a chlorination filtering module 1340, which is composed of a chlorination disinfection system, which removes bacteria and fungi 1341, a sediment filtering system 1342, which removes suspended solids such as soil, sand, silt and particles of organic and inorganic dirt and an activated carbon filter 1343, which works through the principle of chemical adsorption and eliminates compounds such as plaguicides, pesticides and chlorine; a reverse osmosis filtering module 1350, which is composed of a ion exchange system 1351, which softens the water collected by eliminating the excess calcium and magnesium present in the same, a secondary filter of solids 1352, which allows separating solids of the collected water, which have a size of up to 1 micron and a system of reverse osmosis 1353, which allows retaining impurities such as salts and minerals contained in the collected water up to 95.5%; an ultra violet water purification module 1360, which is composed of a ultraviolet light system 1361, which allows the elimination of microorganisms and thus the sterilization of the collected water and an ozone system 1362, which allows the elimination of microbiological materials and thus the collected water can be subsequently stored.

According to the present invention, depending on the desired filtering degree, or the final use of the collected water, the filtering modules can be reduced, having water either for irrigation, animal consumption or human consumption, therefore, the modular filtering system 1300 can have from one to 5 filtering modules.

Referring now to FIGS. 1 to 5 the water storage system 1400 is shown, which refers to a storage tank which may be preferably constituted but not limited to food grade plastic, stainless steel, wood and/or rubber, in wherein said storage system allows to store the collected and purified water for long periods of time safely, and, comprises a stored water distribution valve 1410, which allows to release and obtain the water previously stored. In an alternative embodiment, the water storage system 1400 may be connected to a water distribution network to provide water to remote areas.

Figure 6:
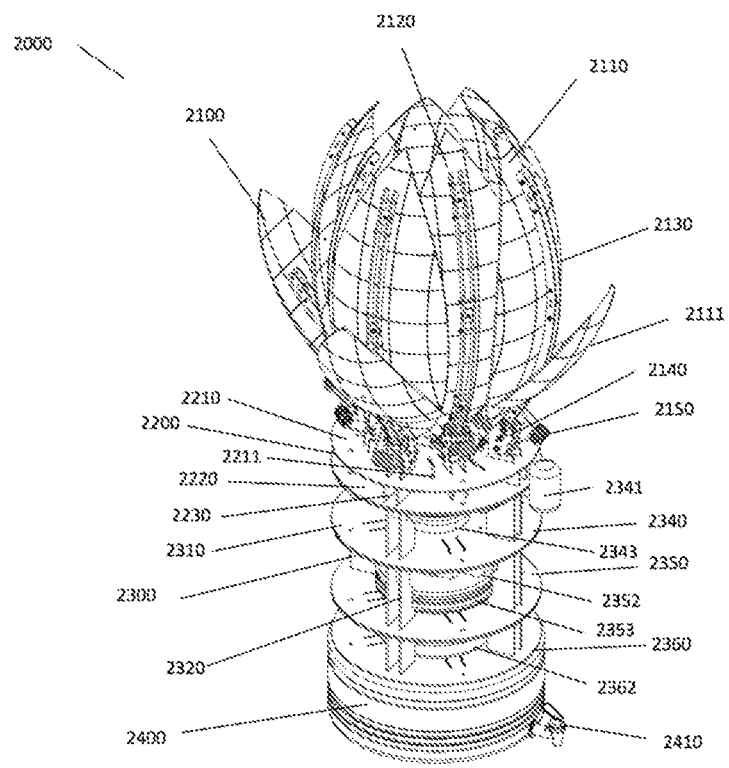
FIG. 6 is a perspective view of a second modality of the automatic rainwater collection system, composed of solar panels in an open conformation, and a perspective view of said second modality of the automatic rainwater collection system, composed of solar panels in a closed conformation.
Figure 6:
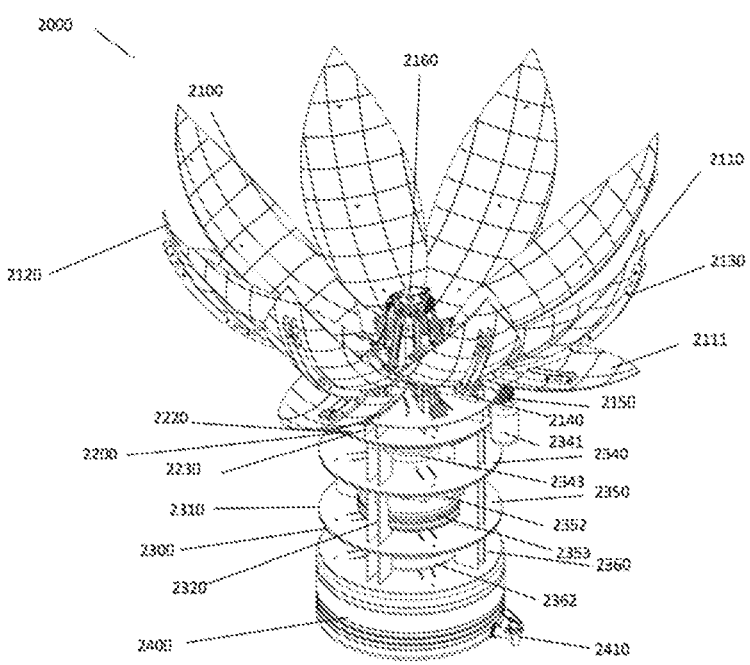

In FIG. 6, an alternative embodiment of the automatic rainwater collection system 2000 is described, in an open conformation and a closed conformation, wherein the flower-shaped rainwater receiving element 2100, is differentiated from the first embodiment of the flower-shaped rainwater receiving element 1100, in that it is composed of external petals 2110, sympetalous 2111 and internal petals 2200, which are constituted mainly by a film of semiconductors that function as photovoltaic cells, to allow capturing solar energy and provide electrical power to the automatic collection system or for other uses. Since the description of the support frame and water accumulative central media 2200, the modular filtering system 2300 and the water storage system 2400 as well as each of its components, have been detailed above, in FIG. 6, the functioning of the components of said embodiment are arranged and operated in the same manner described above.

Figure 7:
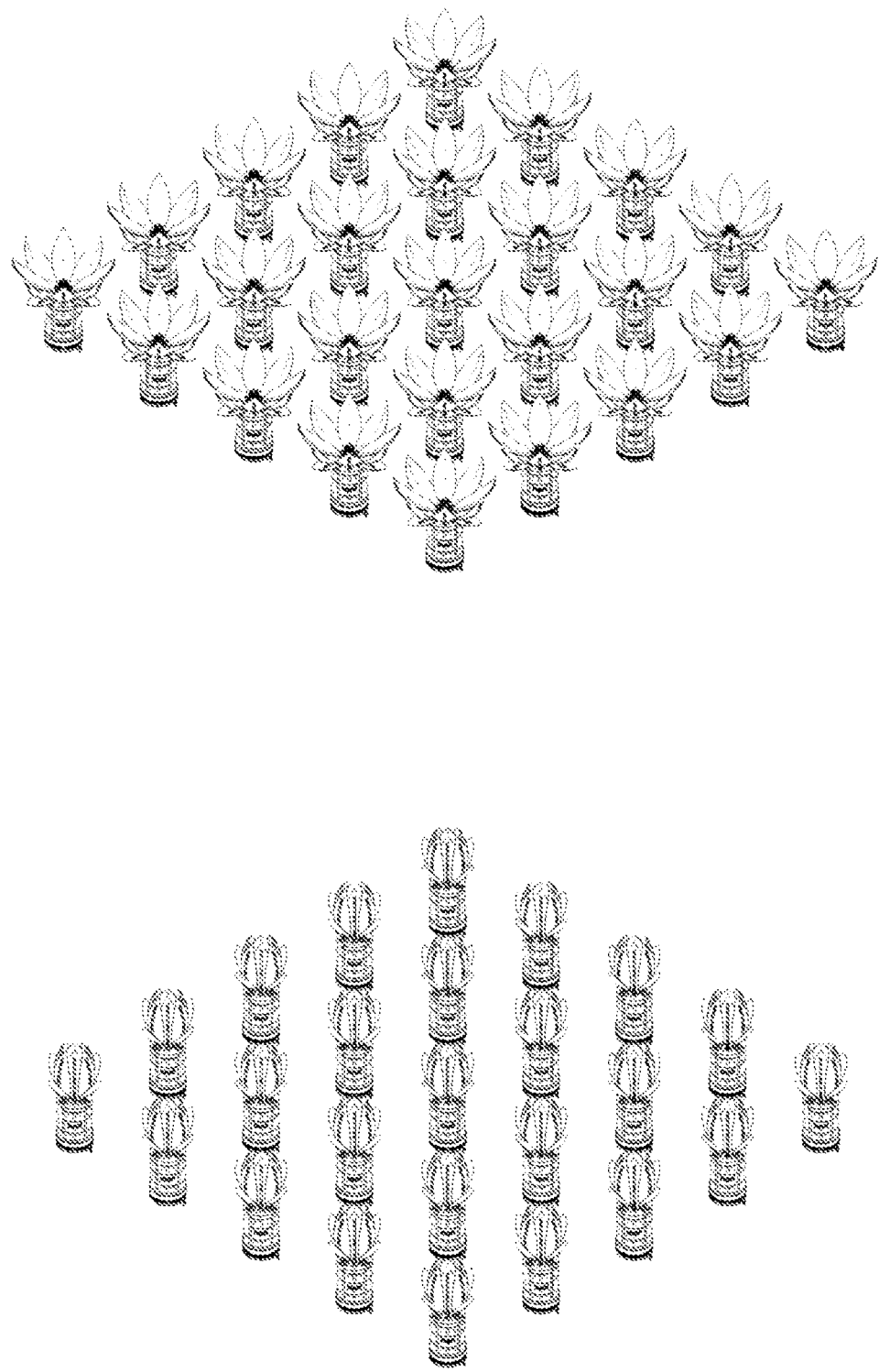
FIG. 7 is a representation of a plurality of automatic rainwater collection systems in both open and closed forms.

Finally, FIG. 7 shows a representation of an array of a plurality of automatic rainwater collection systems both in their open and closed conformations, in order to capture a greater amount of rainwater, and that this water is distributed to remote areas or areas of difficult access.

Since several aspects of various embodiments of this invention were described, it should be noted that several alterations, modifications and improvements can be performed by those skilled in the art. Such alterations, modifications and improvements are intended to be part of this description and are intended to be within the spirit and scope of the invention. Accordingly, the foregoing description and drawings are by way of example only.

The invention claimed is:

1. An automatic rainwater collection system, characterized in that it comprises:
    a flower-shaped rainwater receiving element, having a plurality of internal petals and a plurality of external petals configured to be both opened or closed in an automated manner, wherein each of said plurality of internal and external petals further comprises a support attached to its back surface, said support being pivotally coupled to a joining support that is attached to a support frame configured for supporting the flower-shaped rainwater receiving element, said support frame comprises at least one hole;
    a sensor configured to detect to at least one of: droplet impacts or relative humidity, operatively connected to a motor that is controlled to open or close the plurality of internal and external petals of the rainwater receiving element based on an output of said sensor;
    a modular filtering system for filtering collected water, connected to said rainwater receiving element, which comprises a plurality of filtering modules; and
    a water storage unit configured to store said filtered collected water.

2. The automatic rainwater collection system according to claim 1, wherein each of said plurality of internal and external petals are made of at least one of glass fiber with resin, polymer injection, rubber, wood, or sheet metal with and acetate.

3. The automatic rainwater collection system according to claim 1, wherein said modular filtering system comprises:
    a primary filter configured for filtering solids;
    a chlorination filtering module comprising a chlorination disinfection system;
    a sediment filtering system, which removes suspended solids; an activated carbon filter;
    a reverse osmosis filtering module comprising an ion exchange system, which softens water collected by eliminating excess calcium and magnesium present in the water;
    a secondary filter of solids configured to separate solids of the collected water, and a system of reverse osmosis configured to retain impurities contained in the collected water;
    an ultraviolet water purification module composed of an ultraviolet light system, which allows the elimination of microorganisms and the sterilization of the collected water; and
    an ozone system, which allows the elimination of microbiological materials so that the collected water is subsequently stored.

4. The automatic rainwater collection system according to claim 1, wherein the water storage unit, is made from one of: food grade plastic, stainless steel, wood or rubber, said water storage unit allows storing the collected water.

5. The automatic rainwater collection system according to claim 1, wherein each of said plurality of external petals comprises a sympetaly structurally coupled to said external petal.

6. The automatic rainwater collection system according to claim 5, wherein each of said plurality of external petals, said sympetalous and said plurality of internal petals includes photovoltaic cells to allow capturing solar energy.

* * * * *